(12) United States Patent
Carlson et al.

(10) Patent No.: US 10,236,980 B1
(45) Date of Patent: Mar. 19, 2019

(54) APPARATUS AND METHOD FOR RAPID IDENTIFICATION OF CANDIDATE LASER COMMUNICATION BEACONS

(71) Applicant: BAE Systems Information and Electronic Systems Integration Inc., Nashua, NH (US)

(72) Inventors: Robert T Carlson, Bedford, NH (US); Dennis P Bowler, Sudbury, MA (US); David C Donarski, Manassas, VA (US); David A Haessig, Jr., Towaco, NJ (US); Stuart M Lopata, Totowa, NJ (US); Dale A Rickard, Manassas, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/002,052

(22) Filed: Jun. 7, 2018

(51) Int. Cl.
| | |
|---|---|
| *H04B 10/112* | (2013.01) |
| *H04B 10/118* | (2013.01) |
| *G06K 9/62* | (2006.01) |
| *H04B 10/079* | (2013.01) |
| *G06T 7/13* | (2017.01) |

(52) U.S. Cl.
CPC ......... *H04B 10/118* (2013.01); *G06K 9/6218* (2013.01); *G06T 7/13* (2017.01); *H04B 10/0795* (2013.01); *G06T 2207/20182* (2013.01); *G06T 2207/20216* (2013.01)

(58) Field of Classification Search
CPC ............. H04B 10/112–10/1129; H04B 10/118
See application file for complete search history.

(56) References Cited

U.S. PATENT DOCUMENTS

| | | | |
|---|---|---|---|
| 2015/0188628 A1* | 7/2015 | Chalfant, III | G02B 13/22 398/131 |
| 2016/0204866 A1* | 7/2016 | Boroson | H04B 10/1121 398/97 |
| 2018/0351653 A1* | 12/2018 | Bortz | H04B 10/691 |

OTHER PUBLICATIONS

"Charles Casey, et al.,""Suitability of free space optical communication in militaryenvironments"" 20th International Command & Control Research & TechnologySymposium, 2015, 12 p.http://hdl.handle.net/10945/48026".

* cited by examiner

*Primary Examiner* — Shi K Li
(74) *Attorney, Agent, or Firm* — Maine Cernota & Rardin

(57) ABSTRACT

A disclosed apparatus and method detect light source "hotspots" and recognize laser communication signals within a scene, while minimizing repeat consideration of previously detected light sources. Local maxima are identified in pixel frames from a focal plane array (FPA), and compared with a table of previous detections. FPA frames can be used directly for hotspot detection, or successive FPA frames can be subtracted for edge detection. Most recent detection frame numbers, coordinates, signal values, and/or other information can be updated in the table upon repeat detection of a hotspot. Source identifying information can be included in the table for entries that are identified as laser communication signals. Source identifying features can be evaluated so that only signals of interest are saved in the table. Hotspots that remain undetected after a designated number of frames can be deleted from the table.

27 Claims, 10 Drawing Sheets

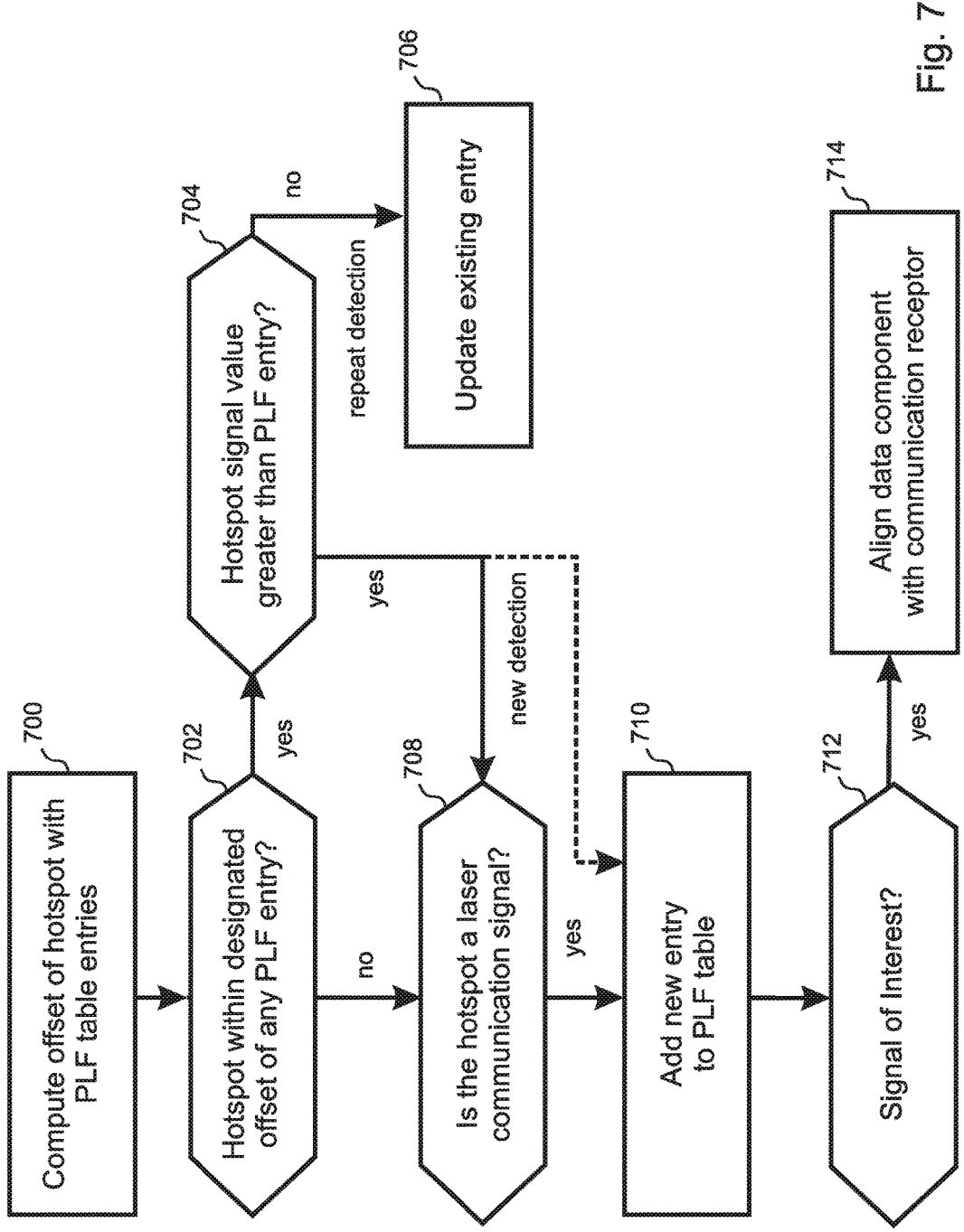

APPARATUS AND METHOD FOR RAPID IDENTIFICATION OF CANDIDATE LASER COMMUNICATION BEACONS

FIELD OF THE DISCLOSURE

The invention relates to wireless telecommunications, and more particularly, to wireless laser communications.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless" as used herein excludes fiber optic communication as well as communication over copper wires.

Traditional communication by wireless radio frequencies suffers from several shortcomings, many of which arise from the wide geographic dispersion of typical radio emissions. Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio channels to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. And so-called "multi-user" detection can be employed to further distinguish signals transmitted on overlapping frequencies.

The geographic range of wireless signals can be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Laser communication offers an attractive wireless alternative to radio communication, especially when point-to-point communication is required, because the non-dispersed, focused character of laser communication intrinsically avoids most of the problems that are associated with radio communication. In particular, there is no need to assign frequency bands to laser communication users, because interference between laser signal beams is avoided so long as two beams are not directed to the same recipient. Laser signals experience very little attenuation as a function of distance, because the signal energy remains tightly focused in a beam. And communication security is intrinsically high, because interception of and interference with laser communications requires direct interception of a laser communication beam, and/or focusing jamming beams directly at an intended signal receiver.

One important application that can benefit significantly from laser communication is satellite communications, where line-of-sight access is generally available, and where the communication distances are very great. Laser communication can provide data rate communications for satellites that are much higher than radio data rates, with unmatched anti-jam characteristics and an inherently low risk of communications intercept. Laser communication also eliminates the need for frequency planning and authorization, and circumvents the highly congested RF spectrum bandwidth constraints that limit the practical data rates available to users of RF links.

With reference to FIG. 1, laser communications holds great promise for multi-Gbps (Giga-bits per second) connections between space platforms 100, as well as between ground-based nodes 102 and space platforms 100, owing to the availability of efficient, multi-watt laser sources and exceedingly high antenna gain, having beam widths of only 10-20 micro-radians and telescope apertures that are only four to eight inches in diameter. And even when much lower data rates of tens to hundreds of mega-bits per second (Mbps) are of interest, laser communication may be desirable due to its Low Probability of Intercept (LPI), Low Probability of Detection (LPD) and anti-jam communications link security.

Of course, there are certain problems associated with laser communication that arise specifically from the focused nature of laser beams. In particular, it is necessary for communicating nodes to geographically identify each other and align their lasers so as to effectively communicate. In the case of satellite laser communication, the identification and alignment problems are especially acute, because laser sources that are well separated by terrestrial standards, for example several miles apart from each other, may nevertheless appear to be almost geographically overlapping from the viewpoint of a satellite. Furthermore, thermal and other effects of the atmosphere can lead to angular (apparent location) shifting of an incident laser communication beam even after it is identified and aligned. These angular vibrational effects, together with other short-term mechanical instabilities of the satellite itself, are referred to herein collectively as "jitter."

With reference to FIG. 2, there are at least four steps that must be accomplished so as to establish and maintain laser communications. First, a candidate light source must be identified from within a scene of interest 200. Second, the candidate light source must be verified as being a communication beam or beacon, and its transmission source must be identified so as to determine if it is a beam or beacon of interest 202. Third, the optics of the laser communication receiving system must be aligned with the incoming beam 204, and finally, once communication has been established, the beam must be tracked during communication so that the alignment is maintained and the communication is not interrupted 206.

It should be noted that the disclosure herein is mainly presented with reference to satellite communication. However, it will be understood by those of skill in the art that the present disclosure is not limited strictly to satellite communication, but also applies to other implementations of laser communication.

The present disclosure is directed to the first of the steps 200 of FIG. 2, wherein there is a need for a more rapid and reliable apparatus and method for recognizing and distinguishing light sources within a scene that are candidate laser communication signals, while avoiding unnecessary consideration and/or reconsideration of light sources that are unrelated to laser communication or otherwise not of interest.

SUMMARY

A rapid and reliable apparatus and method are disclosed for recognizing and distinguishing light sources within a scene that are laser communication signals, while avoiding unnecessary consideration or reconsideration of other light sources that are unrelated to laser communication, or have previously been determined to be laser communication signals that are not of interest.

In embodiments, incoming light from a scene representing a geographical region of interest is directed onto a focal plane array (FPA) comprising a plurality of light sensors arranged in rows and columns. The FPA is continuously and periodically sampled to obtain FPA "frames" of pixels, where each of the pixels in a frame is characterized by a pair of integer coordinate values that indicate the row and column location of the corresponding light sensor in the FPA, and by a signal value equal to the signal output of the corresponding FPA light sensor at the time that the frame was recorded.

In embodiments, the laser communication signals comprise two overlapping, co-linear beam components that are transmitted at different wavelengths, whereby one of the two beam components is used for data communication, and the other of the two beam components is a "beacon" component that is used to identify the source of the laser communication signal. In some of these embodiments, the two components are separated by the disclosed apparatus, and the beacon component is directed onto the FPA, while the data component is directed to a communication receptor such as a fiber optic for receipt of the laser communicated data.

A "detection frame" of pixels is derived from each of the FPA frames, and is analyzed to detect local maxima of light amplitude in the frame, referred to herein as "hotspots." In some embodiments, each FPA frame of pixels is treated as a detection frame. In other embodiments, edge-detected detection frames are calculated by subtracting from each current FPA frame the most recent, previous FPA frame, so as to provide a time-domain edge detected frame of pixels, where each edge detected pixel in the edge detected frame of pixels has an edge detected signal value equal to the absolute value (in embodiments) of the difference between the signal values of the corresponding pixels in the current FPA frame and most recent, previous FPA frame. This edge-detected approach is valuable, for example, when it is known that the laser signal beacons are amplitude modulated, such as with a square-wave amplitude modulation. In that case, light sources that are constant in amplitude will be cancelled by the edge-detection process, while laser signal sources will stand out in edge-detected frames whenever the two FPA frames used to calculate the edge-detected frame fall on either side of a beacon amplitude transition. Of course, glints and other non-laser sources of light, as well as intentional laser jamming light sources, may be variable in amplitude, and may thereby survive edge detection.

For each detection frame of pixels, the local maxima of the detection frame are determined. In embodiments, local maxima are defined simply as any pixel having a signal value that is higher than the signal value of any adjacent pixel. Other embodiments further apply "pixel averaging" when determining the local maxima in each pixel frame. According to this approach, the signal values from clusters of adjacent pixels are added together or averaged so as to improve the signal-to-noise of the measurements. In some of these embodiments, the individual signal value obtained from each pixel is replaced by the sum or average of that signal value with the signal values of adjacent pixels, so that averaging occurs without a substantial reduction in total the number of pixels included in the detection frame.

For example, in some embodiments the pixels of the detection frame are grouped into 2×2 squares, and each pixel signal value is replaced by the sum or average of its signal value and the pixel signal values of the pixels immediately above, to the right, and diagonally above and to the right, so that each pixel signal value is replaced by an average or sum of four pixel signal values. This process can be carried out, for example, for all pixels in the detection frame except for those that are along the top and right hand sides of the detection frame.

Those of the local maxima that exceed a determined level threshold are then designated as hotspots. Upon initial detection, these designated hotspots are essentially candidate laser signals of interest ("SOIs"), in that additional review is required before they are determined to be SOIs, or not.

According to the present disclosure, the designated hotspots are compared with a table of laser signal entries that records previous hotspot detections and is referred to herein as the laser signal table, or alternatively as the "Position, Level, and (source identifying) Feature" table or "PLF" table, which is maintained by a signal table manager, also referred to herein as the PLF table manager. It should be noted that although the table is referred to herein as a "laser signal table," in some embodiments the table includes entries that correspond to previously detected hotspots that are not laser signals.

Each entry in the laser signal table includes the coordinate values, signal value, and (in embodiments) source identifying feature information pertaining to a laser signal or other detected hotspot, as well as a record of the most recent detection frame number in which the laser signal or other hotspot was detected. It should be noted that, for consistency of terminology, the term "PLF table" is treated as synonymous with "laser signal table," and is used herein to refer to the disclosed position and signal value tables, even in embodiments where the table does not further include source identifying feature information.

Comparison of the detected hotspots with the PLF table includes computing an offset between each of the newly detected hotspots and all of the entries in the PLF table, according to differences between the coordinate values. If a newly detected hotspot is within a designated offset of a laser signal entry in the PLF table, and the signal value of the new hotspot is less than the signal value of that entry, the newly detected hotspot is determined to be a repeat detection, whereby the most recent frame number is updated for the overlapping laser signal entry in the PLF table, but no new laser signal entry is added to the PLF table. However, in embodiments, if the signal value of the newly detected hotspot is greater than the signal value of the corresponding PLF table entry, then it is considered to be a new detection. This approach prevents a previously detected non-laser light source from inadvertently blocking detection of an actual laser communication signal that might subsequently appear at substantially the same location in the scene.

In embodiments, upon repeat detection of a hotspot, the position, level, and/or source identifying information (e.g. wavelength, modulation characteristics, etc) of the existing laser signal entry is/are also adjusted, for example by updating the position, level and/or source identifying information to newly measured values, or by incorporating the newly measured values into static or sliding averages that are maintained by the PLF table manager. In some embodiments, the offset between a newly detected hotspot and a laser signal entry is calculated as a distance, i.e. as the square root of the sum of the squares of the X and Y coordinate offsets. In other embodiments, the offset calculation is simplified by calculating only the sum of the absolute values of the X-coordinate difference and the Y-coordinate difference.

If a newly detected hotspot does not fall within the designated offset of any existing laser signal entry in the PLF table, it is designated as a new hotspot, whereupon information regarding the new hotspot is directed to a laser signal identifier, which determines whether or not the hotspot is a laser communication signal. In various embodiments, the laser signal identifier makes this determination by comparing the hotspot information with properties such as an amplitude modulation frequency or pattern that are expected properties of a laser communication signal. In embodiments, at least one source identifying feature of each detected laser communication signal is evaluated to determine a source thereof and thereby determine if the laser communication signal is a signal of interest (SOI).

Depending on the embodiment and on the nature of the new hotspot, the positions, source identifying characteristic(s), and amplitude levels of at least some of the new hotspots are added to the PLF table, along with the frame number in which each recorded hotspot was most recently detected. In some embodiments, all new hotspots that are laser communication signals or beacons are recorded in the PLF table, whether or not they are of interest. In other embodiments, only new hotspots that are laser beacons or other laser communication signals of interest are recorded in the PLF table. In embodiments, the laser signal entries in the PLF table includes information indicating the source identifying features of the detected laser communication signals.

In various embodiments, if it is determined that the new hotspot is not a laser communication signal, then no entry is made in the laser signal table. In other embodiments, laser signal entries are made for all new hotspots, and information such as a Boolean value is included in each entry to indicate whether or not the entry pertains to a laser communication signal. This approach can avoid repeated reconsideration by the laser signal identifier of the same non-laser hotspot.

In various embodiments, laser signal entries pertaining to hotspots that weaken in amplitude or cease altogether, and consequently are not detected after a designated number of frames have passed, are deleted from the PLF table.

A first general aspect of the present disclosure is a method of identifying and monitoring candidate laser communication signals in a scene of interest. The method includes
   a) directing light received from the scene of interest onto a focal plane array (FPA) comprising a plurality of light sensors, each of the light sensors being associated with a pair of integer coordinates indicating a row and column that the light sensor occupies in the FPA, each of the light sensors being configured to generate a signal output;
   b) obtaining a detection frame of pixels, each of the detection frame pixels having a pair of integer coordinates equal to the coordinates of an associated light sensor in the FPA, and a detection signal value derived at least in part from the signal output of the associated light sensor in the FPA;
   c) identifying all local maximum pixels from among the detection frame pixels, each of the local maximum pixels being a pixel having a detection signal value that is greater than the detection signal values of all detection frame pixels having coordinates that differ by no more than one from the corresponding coordinates of the local maximum pixel;
   d) designating as hotspots all local maximum pixels having detection signal values that are greater than a minimum hotspot threshold value;
   e) for each of the hotspots:
   f) calculating an offset between the hotspot and each laser signal entry in a laser signal table according to differences between the coordinates of the hotspot and coordinates included in the laser signal entries;
   g) if there is an overlapping laser signal entry for which the calculated offset is less than a specified minimum offset, replacing a most recently detected frame number of the overlapping laser signal entry with a frame number of the detection frame of pixels; and
   h) if the calculated offset is greater than the specified minimum offset for all of the laser signal entries in the laser signal table, and if the hotspot meets designated laser signal table criteria, adding a new laser signal entry to the laser signal table having coordinates equal to the coordinates of the hotspot and a most recently detected frame number equal to the frame number of the detection frame of pixels.

In embodiments, the detection signal values of the pixels in the detection frame are equal to the signal outputs of the associated light sensors of the FPA as measured at a measurement time of the detection frame.

In any of the above embodiments, the method can further include obtaining a first frame of pixels from the FPA at a first measurement time, each of the first frame pixels having a pair of integer coordinates equal to the coordinates of an associated light sensor in the FPA and a signal value equal to the signal output of the associated light sensor at the first measurement time, obtaining a second frame of pixels from the FPA at a second measurement time that is delayed after the first measurement time by a time interval td, each of the second frame pixels having coordinates equal to coordinates of a corresponding first frame pixel and its associated light sensor, and having a signal value equal to the signal output of the associated light sensor at the second measurement time, and for each of the detection pixels in the detection frame, setting the detection signal value equal to the absolute value of a difference between the signal values of the first frame pixel and the second frame pixel having the same integer coordinates as the detection pixel.

Any of the above embodiments can further include, if, after completing step e) a difference between the most recently detected frame number of a laser signal entry in the laser signal table and the frame number of the detection frame of pixels exceeds a maximum value, removing the laser signal entry from the laser signal table.

In any of the above embodiments, the designated laser signal table criteria can specify that a new laser signal entry be added to the laser signal table pertaining to each designated hotspot for which the calculated offset is greater than the specified minimum offset for all of the laser signal entries in the laser signal table.

In any of the above embodiments, determining if the hotspot meets the designated laser signal table criteria can include directing at least one of measured information and light associated with the hotspot to a signal identifier; and determining that the designated hotspot meets the designated laser signal table criteria if the hotspot is identified as a laser signal by the laser signal identifier. And in some of these embodiments, in step e), the new laser signal entry further includes source identifying information that indicates a source of the hotspot.

In any of the above embodiments, in step e), the new laser signal entry can further include a signal value equal to the detection signal value of the hotspot.

In any of the above embodiments, in step e), adding the new laser signal entry to the laser signal table can further include setting a Boolean flag associated with the new laser signal entry to indicate that the new laser signal entry is new, and the method can further include, for all laser signal entries in the laser signal table that were not newly entered during steps a) through h), setting its associated Boolean flag to indicate that the laser signal entry is not new.

In any of the above embodiments, the minimum hotspot threshold value can be determined at least in part according to a computed Poisson noise level calculated according to a frame of pixels derived from the FPA. In some of these embodiments determining the minimum hotspot threshold value includes adding a minimum noise threshold value to the computed Poisson noise level.

Any of the above embodiments can further include, after step b) and before step c), for each of the pixels in the detection frame, replacing the detection signal value $s(i,j)$, where i and j are the integer coordinates of the detection frame pixel, with a sum or an average $S(i,j)$ of the detection signal value $s(i,j)$ and at least one adjacent detection signal value $s(k,l)$, where the absolute value of (i−k) is one and/or the absolute value of (j−l) is one. In some of these embodiments, the values $S(i,j)$ are quad-cell values calculated according to the formula $S(i,j)=(s(i,j)+s(i+1,j)+s(i, j+1)+s(i+1, j+1))/4$.

A second general aspect of the present disclosure is an apparatus for identifying and monitoring candidate laser communication signals in a scene of interest. The apparatus includes a focal plane array (FPA) comprising a plurality of light sensors, each of the light sensors being associated with a pair of integer coordinates indicating a row and column that the light sensor occupies in the FPA, each of the light sensors being configured to generate a signal output; and a beam directing device configured to direct light from the scene of interest onto the FPA.

The apparatus further includes a hotspot identifier configured to obtain a detection frame of pixels, each of the detection frame pixels having a pair of integer coordinates equal to the coordinates of an associated light sensor in the FPA, and a detection signal value derived from the signal output of the associated sensor in the FPA, identify all local maxima included among the detection frame pixels, the local maxima being defined as pixels having a detection signal value that is greater than the detection signal values of all detection frame pixels having integer coordinates that differ by no more than one from the corresponding integer coordinates of the local maximum pixel, and designate as hotspots all of the local maxima having detection signal values that are greater than a minimum hotspot threshold value.

The apparatus further includes a signal table manager configured to maintain a table of laser signal entries, each of the laser signal entries including a pair of integer coordinates, a signal value, and a most recently detected frame number, the signal table manager being further configured to receive information regarding the hotspots from the hotspot identifier, and for each of the hotspots:

calculate an offset between the hotspot and each of the laser signal entries in the laser signal table according to differences between the coordinates of the hotspot and the coordinates of the laser signal entries;

if there is an overlapping laser signal entry for which the calculated offset is less than a specified minimum offset, replace the most recently detected frame number of the overlapping laser signal entry with a frame number of the detection frame of pixels; and if the calculated offset is greater than the specified minimum offset for all of the laser signal entries in the laser signal table, and if the designated hotspot meets designated laser signal table criteria, adding to the laser signal table a new laser signal entry having integer coordinates equal to the integer coordinates of the hotspot and a most recently detected frame number equal to the frame number of the detection frame of pixels.

In embodiments, the apparatus further includes a frame differencer configured to obtain a first frame of pixels from the FPA at a first measurement time, each of the first frame pixels having a pair of integer coordinates equal to the coordinates of an associated light sensor in the FPA and a signal value equal to the signal output of the associated light sensor at the first measurement time, obtain a second frame of pixels from the FPA at a second measurement time that is delayed after the first measurement time by a time interval td, each of the second frame pixels having a pair of integer coordinates equal to the coordinates of a corresponding first frame pixel and its associated light sensor, and having a signal value equal to the signal output of the associated light sensor at the second measurement time, and calculate a detection frame of pixels that is an edge detected frame of pixels, wherein each of the edge detected frame pixels comprises a pair of integer coordinates, and an edge detected signal value equal to the absolute value of a difference between the signal values of the first frame and second frame pixels having the same integer coordinates.

In any of the above embodiments, for each of the detection frame pixels, the frame differencer can be configured, after calculating the edge detected frame of pixels, to replace the detection signal value $s(i,j)$, where i and j are the integer coordinates of the detection frame pixel, with a sum or average $S(i,j)$ of the detection signal value $s(i,j)$ and at least one adjacent detection signal value $s(k,l)$, where the absolute value of (i−k) is one and/or the absolute value of (j−l) is one. In some of these embodiments, the values $S(i,j)$ are quad-cell values calculated according to the formula $S(i,j)=(s(i,j)+s(i+1,j)+s(i, j+1)+s(i+1, j+1))/4$.

Any of the above embodiments can further include a laser signal identifier configured to determine if a hotspot is a laser signal, the signal table manager being further configured to cause at least one of measured information and light associated with the hotspot to be directed to the laser signal identifier if all of the calculated offsets are greater than the specified minimum offset, and if the hotspot is identified as a laser signal by the laser signal identifier, add a new laser signal entry to the laser signal table having integer coordinates equal to the integer coordinates of the hotspot and a most recently detected frame number equal to the frame number of the detection frame of pixels. In some of these embodiments, the laser signal table manager is further configured to include in the new laser signal entry source identifying information that indicates a source of associated laser signal.

Any of the above embodiments can further include a beam dividing device configured to separate overlapping and congruent laser beams of differing wavelengths received from the scene of interest. In some of these embodiments, the beam dividing device comprises at least one of a diffraction grating, a prism, a beam splitter, and a bandpass filter. In any of these embodiments, the apparatus can further include a laser data receiver, and the beam dividing device can be configured to direct one of the congruent beams onto the laser data receiver while simultaneously directing the other of the congruent beams to the FPA.

In any of the above embodiments, the signal table manager can be further configured to remove all laser signal entries from the laser signal table for which a difference between the most recently detected frame number of the laser signal entry and the frame number of the detection frame of pixels exceeds a maximum value.

In any of the above embodiments, the laser signal table manager can be further configured to include the detection signal value of the associated hotspot as the signal value of the new laser signal entry.

In any of the above embodiments, each of the laser signal entries in the laser signal table can includes a new entry Boolean flag, and the laser signal table manager can be further configured to set the new entry Boolean flag of all new laser signal entries to indicate that they are new, and to set the new entry Boolean flags of all laser signal entries that are not new to indicate that they are not new.

In any of the above embodiments, the hotspot identifier can be configured to determine the minimum hotspot threshold value at least in part according to a Poisson noise level calculated according to a frame of pixels derived from the FPA. And in some of these embodiments, the hotspot identifier is configured to determine the minimum hotspot threshold value at least in part according to a sum of a noise threshold and the computed Poisson noise level.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 7 is a flow diagram that indicates steps used to process a newly detected hotspot in embodiments of the present disclosure.

DETAILED DESCRIPTION

The present disclosure is a rapid and reliable apparatus and method for recognizing and distinguishing light sources within a scene that are candidate laser communication signals, while avoiding unnecessary consideration or reconsideration of light sources that are unrelated to laser communication, and/or sources that have previously been determined to be laser communication signals that are not of interest.

Figure 1:
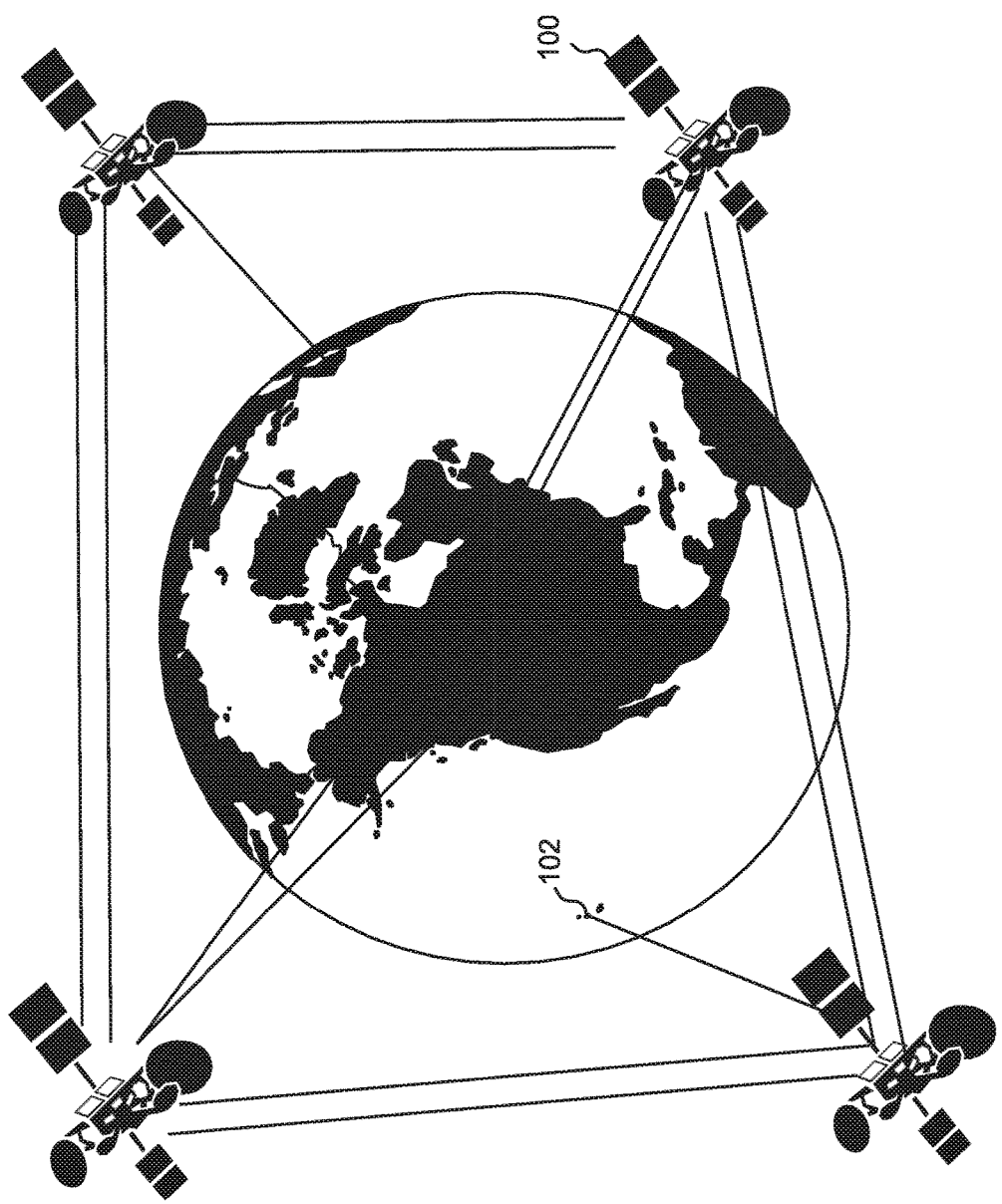
FIG. 1 illustrates laser communication between orbiting satellites, and between the satellites and ground-based nodes.
Figure 2:
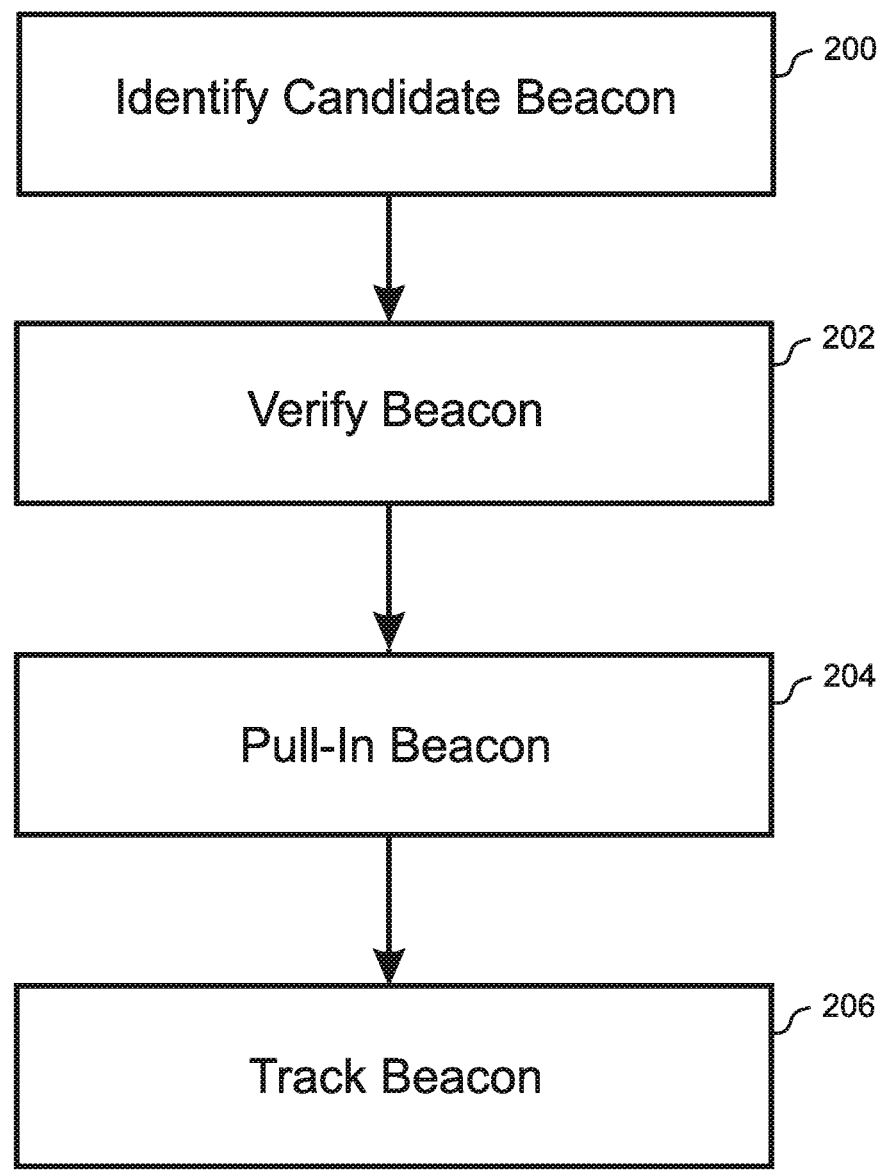
FIG. 2 is a flow diagram illustrating steps required for aligning a laser communication receiving system with a transmitting node.
Figure 3A:
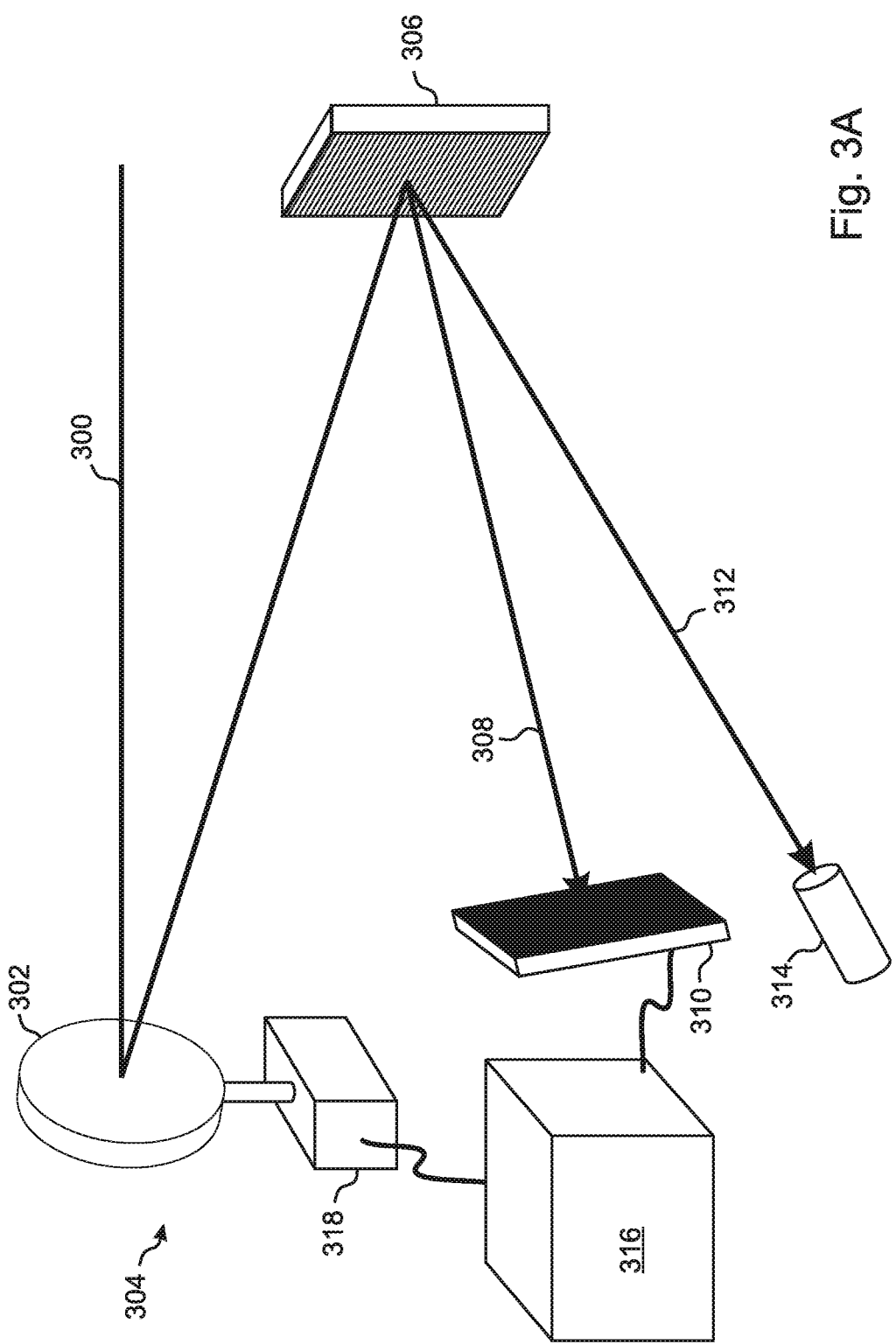
FIG. 3A is a block diagram that illustrates components of a laser communication receiving apparatus according to an embodiment of the present disclosure.

With reference to FIG. 3A, in embodiments laser communication signals 300 comprise two overlapping, co-linear beam components 308, 312 that are transmitted at different wavelengths, whereby a "data" component 312 of the two beam components is used for data communication, while a "beacon" component 308 of the two beam components is used to verify that the beam is a laser communication signal, and to identify the source of the laser communication signal to the satellite 100 or other laser signal receiving node. In some of these embodiments, the amplitude of the beacon 308 is modulated in a pattern that identifies the light 300 as a laser communication signal, and also identifies the source of the laser communication signal. In some of these embodiments, the modulation of the beacon 308 is a square wave amplitude modulation having a characteristic modulation frequency.

In the embodiment of FIG. 3A, the incoming light 300 from a scene representing a geographical region of interest is directed by a beam directing device 304 onto a beam dividing device 306 that spatially separates the two components 308, 312 of laser communication signals from each other. The beam directing device 304, which in the embodiment of FIG. 3A includes a mirror 302 driven by a servo motor 318 that is controlled by a controller 316, adjusts the direction of the incoming beam 300 such that the beacon component 308 is directed from the beam dividing device 306 onto a focal plane array (FPA) 310 comprising a plurality of light sensors arranged in rows and columns. When a signal of interest is identified, as discussed below, the beam directing device 306 adjusts the path of the beam 300 so that the beacon component 308 is centered on a target location of the FPA 310, and the data component 312 is directed onto a laser data receiver 314, such as a fiber optic, that is configured to receive laser communicated data. In embodiments, the beam dividing device 306 can include prisms, beam splitters, gratings, and/or bandwidth filters.

The light sensors of the focal plane array 310 are continuously and periodically sampled to obtain FPA "frames" of pixels, where each of the pixels in a frame is characterized by a pair of integer coordinate values that indicate the row and column location of a corresponding light sensor in the FPA, and a signal value that is equal to the signal output of the corresponding FPA light sensor at the time that the frame was recorded.

A detection frame of pixels is derived from the each of the FPA frames, and is analyzed to detect local maxima of light amplitude in the detection frame, referred to herein as "hotspots." In some embodiments, each FPA frame of pixels is treated as a detection frame. In other embodiments, edge-detected detection frames are calculated by subtracting from each current FPA frame the most recent, previous FPA frame so as to provide a time-domain edge detected frame of pixels, where each edge detected pixel in the edge detected frame of pixels has an edge detected signal value equal to the absolute value (in embodiments) of the difference between the signal values of the corresponding pixels in the current FPA frame and most recent, previous FPA frame.

This edge-detected approach is valuable, for example, when it is known that the laser signal beacons are amplitude modulated, such as with a square-wave amplitude modulation. In that case, light sources that are constant in amplitude will be cancelled by the edge-detection process, while laser signal sources will stand out in edge-detected frames whenever the two FPA frames used to calculate the edge-detected frame fall on either side of a beacon amplitude transition. If the frame sampling rate is faster than the beacon modulation rate, for example twice as fast as a beacon square wave modulation frequency, then in some embodiments the amplitude modulation rate of the beacon can be estimated by analyzing the pattern of detections and non-detections of the beacon in successive edge detected frames. Of course, glints and other non-laser sources of light, as well as intentional laser jamming light sources, may also be variable in amplitude, and may thereby survive edge detection.

Figure 3B:
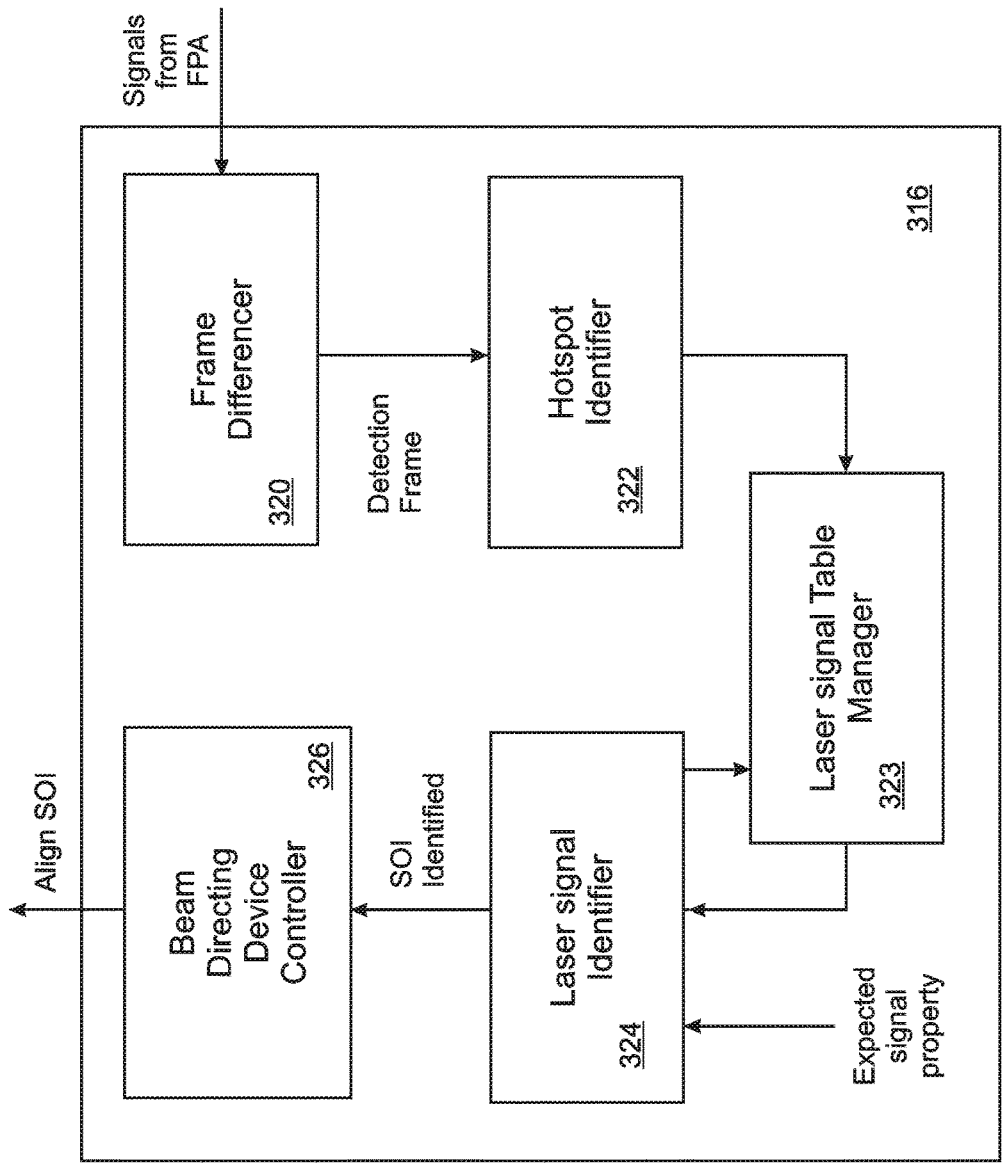
FIG. 3B is a block diagram illustrating details of the structure of a controller in an embodiment of the present disclosure.
Figure 3C:
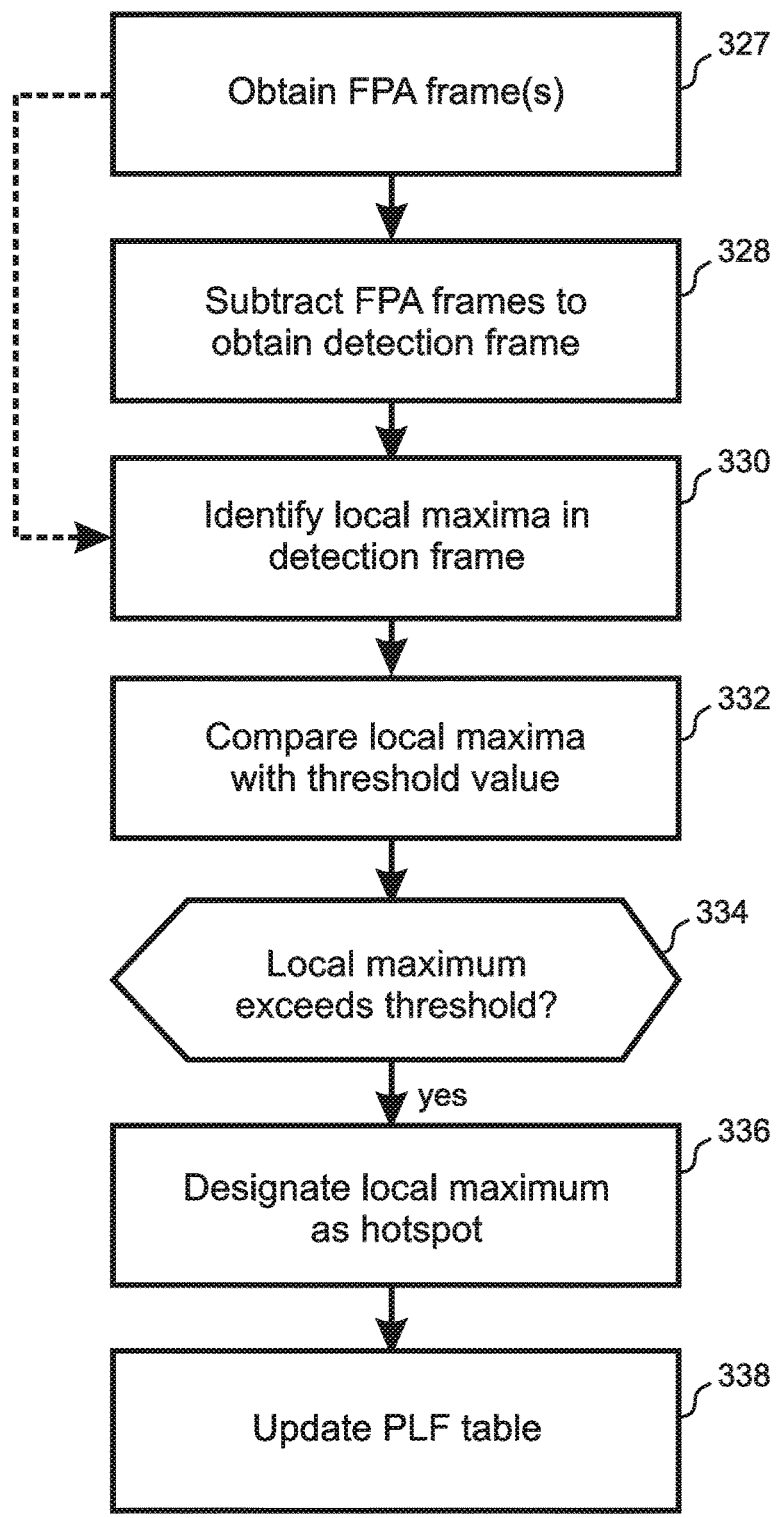
FIG. 3C is a flow diagram illustrating steps performed by the controller of FIG. 3B in embodiments of the present disclosure.

With reference to FIGS. 3B and 3C, according to embodiments of the present disclosure, after obtaining consecutive first and second FPA frames separated by a time td 327, the FPA frames are directed to a frame differencer 320 that subtracts 328 the signal values of the pixels in the first frame from the signal values of the pixels in the second frame, and calculates absolute values of the differences, so as to provide a time-domain edge detected "detection" frame of pixels, where each detection pixel in the detection frame of pixels has a detection signal value equal to the absolute value of the difference between the signal values of the corresponding pixels in the first and second FPA frames. In other embodiments, each FPA frame is treated separately as a detection frame (dotted line from 327 to 330 in FIG. 3B).

After obtaining the detection frame of pixels, the detection pixels in the detection frame of pixels are processed by a "hotspot identifier" 322 that determines local maxima 330 and identifies hotspots within the edge-detected frame of pixels that are candidate laser signals or candidate beacon components 200 of laser signals.

Figure 4A:
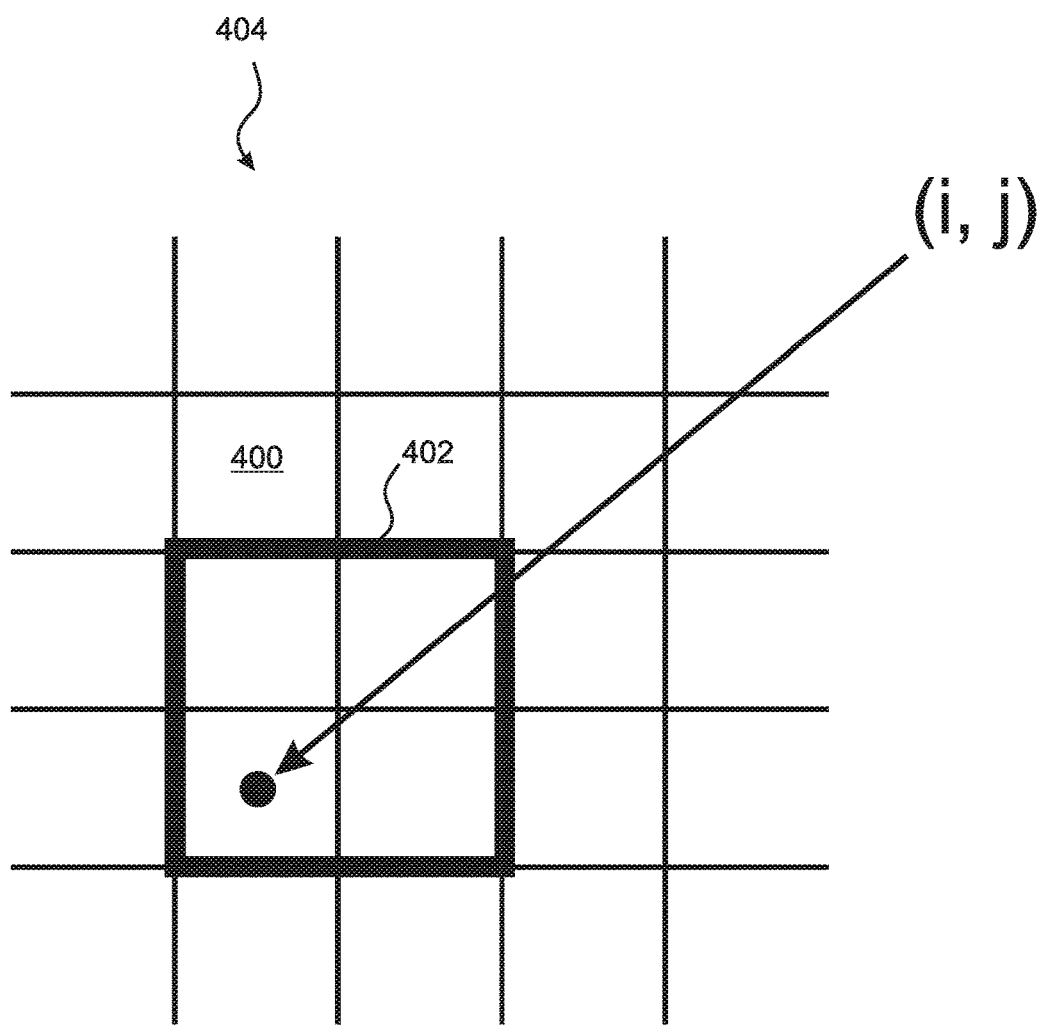
FIG. 4A is a close-up view of a pixel frame illustrating a quad-cell of four pixels.
Figure 4B:
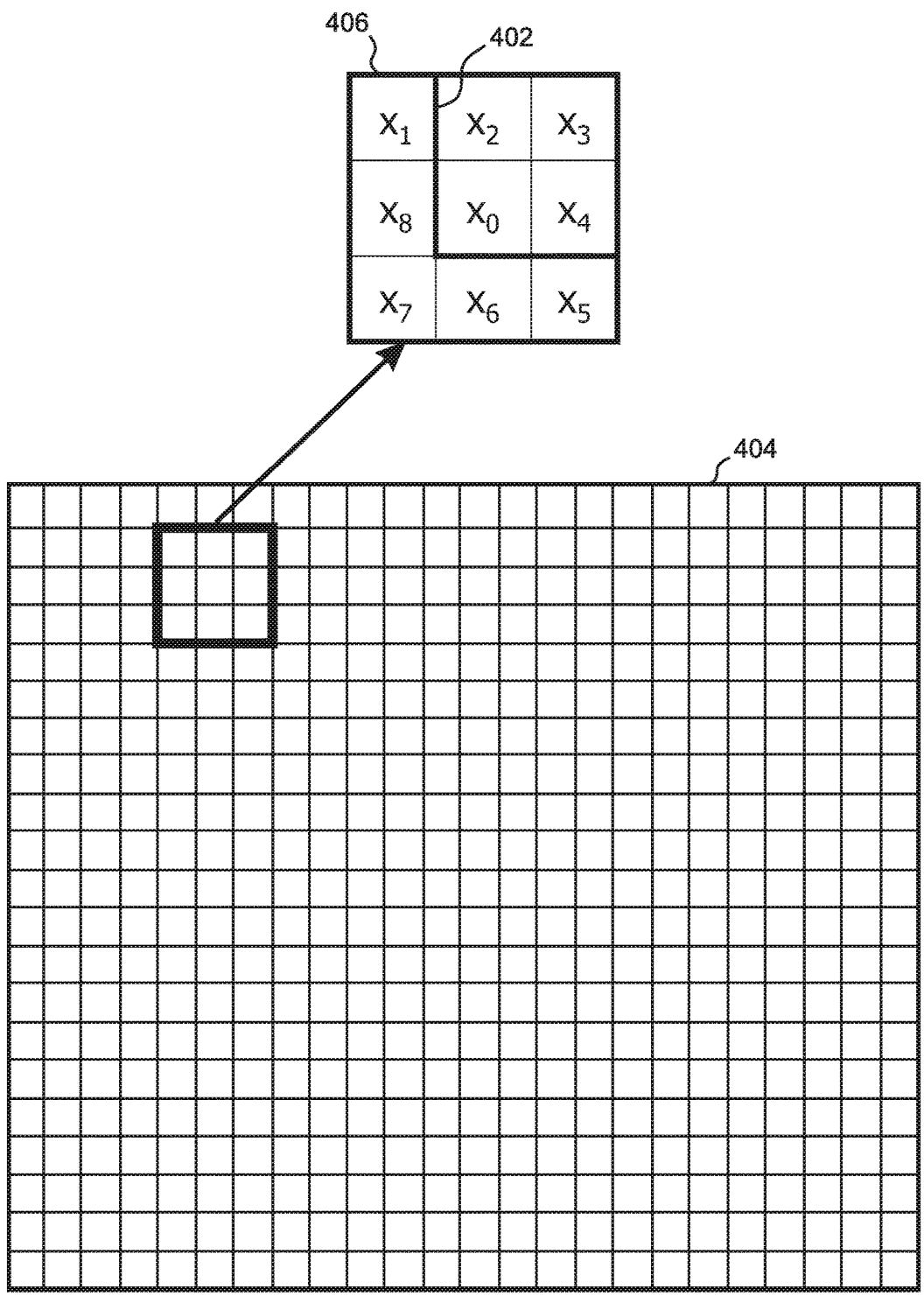
FIG. 4B illustrates the definition of a local maximum pixel or local maximum quad-cell in embodiments of the disclosure.

With reference to FIGS. 4A and 4B, in embodiments local maxima are defined simply as any pixel $X_0$ in a pixel frame 404 having a value that is higher than the value of any adjacent pixel 406 ($X_1$ through $X_8$). Other embodiments of the present disclosure apply spatial filtering in the form of "pixel averaging" when determining the local maxima in each detection frame. According to this approach, the signal values from clusters 402 of adjacent pixels 400 are added together or averaged so as to improve the signal-to-noise of the measurements. In some of these embodiments, the individual signal value of each pixel in the detection frame is replaced by the sum or average of that signal value with the signal values of adjacent pixels, so that the averaging occurs without a substantial reduction in total the number of pixels included in the detection frame.

For example, in the embodiment of FIGS. 4A and 4B the pixels 400 in each frame 404 are grouped into 2×2 squares 402, and the signal value of each pixel (indicated as pixel (i, j) in the figure containing the black dot) is replaced by the sum or average of that signal value and the signal values of the pixels immediately above, to the right, and diagonally above and to the right (collectively element 402 in the figure), so that the signal values for each pixel is replaced by an average or sum of the signal values of four pixels. For this reason, the local maxima and hotspots in these embodiments are sometimes referred to as "quad peaks," and the averaging is sometimes referred to as "quad-pixel" averaging. This averaging process can be carried out, for example, for all pixels in the detection frame 404 except for those that are along the top and right hand sides of the frame 404. In the embodiment of FIG. 4B, the signal value of each pixel $X_0$ has been replaced by the average of the signal values over the associated quad-cell 402.

With reference again to FIGS. 3B and 3C, once the local maxima are identified in the detection pixel frame, the hotspot identifier 322 compares the local maxima with a determined level threshold 332, and designates those of the local maxima that exceed the threshold 334 as hotspots 336. In some embodiments, the pixels that lie long the outer edges of the focal plane array are excluded, because they are not fully surrounded by other pixels. In some embodiments, as discussed in more detail below, entries are created 338 in a laser signal table for all detected hotspots that are not repeat detections of hotspots that are already documented in the laser signal table. In other embodiments, new laser signal entries are created only for hotspots that are identified by a laser signal identifier 324 as valid laser communications signals.

Figure 5:
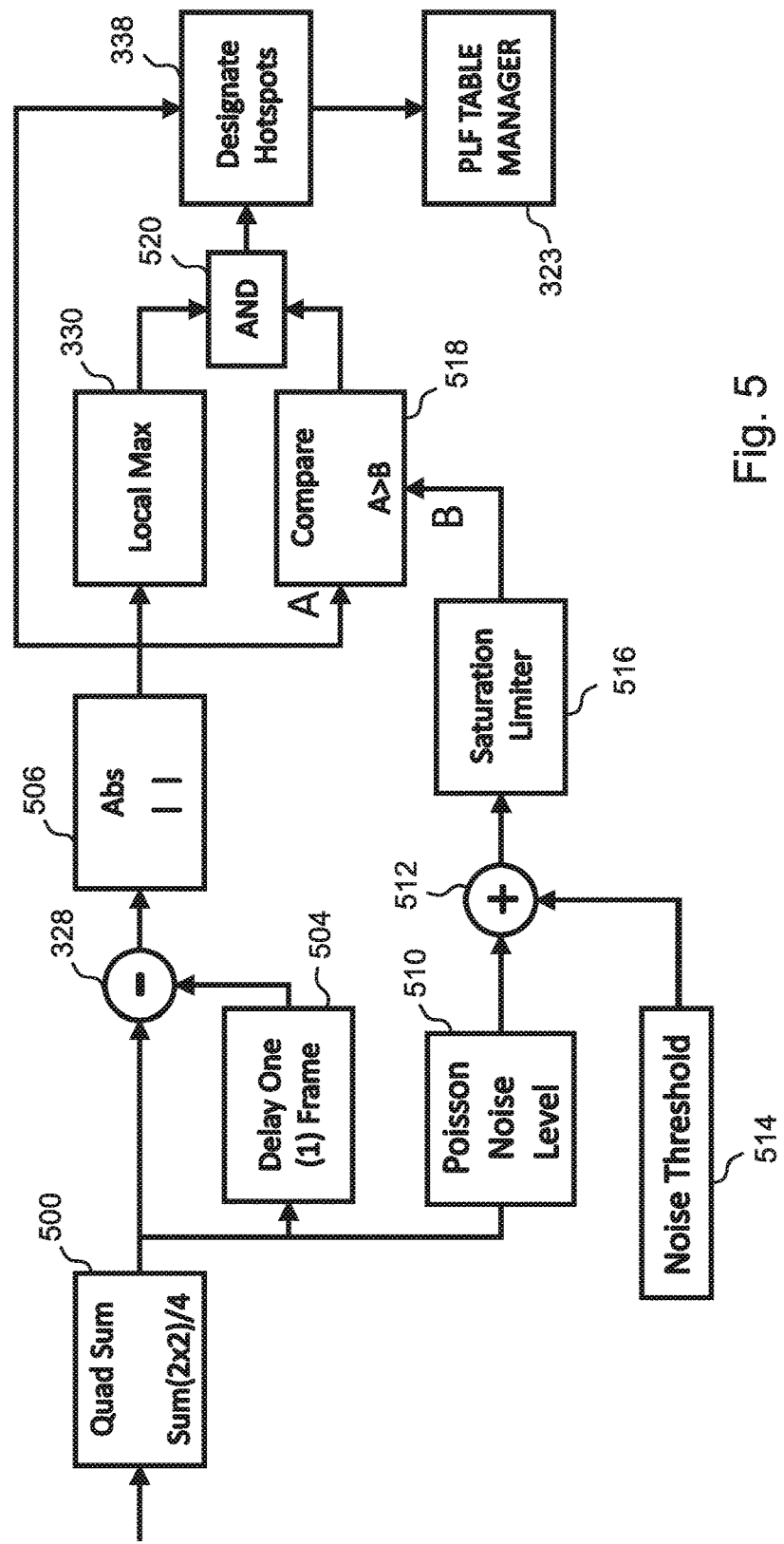
FIG. 5 is a flow diagram that illustrates an embodiment of the disclosed method that detects and maintains a table of laser signals.

A more detailed example of the process outlined in FIGS. 3B through 4B is presented in the flow diagram of FIG. 5. In the embodiment of FIG. 5, after quad pixel averaging 500 (described in more detail above with reference to FIGS. 4A and 4B), the analysis of each FPA frame includes subtraction 328 of the signal values of the most recent, previous FPA frame 504 so as to provide a detection frame that includes pixel signal values with time-domain edge detection, after which the absolute values of the edge detected pixel signal values are calculated 506 and the local maxima of the detection frame are determined 330.

Those of the local maxima 330 that exceed a determined level threshold are designated as hotspots 336. In the embodiment of FIG. 5, the Poisson noise level 510 of the detection pixel frame 404 is combined 512 with a noise threshold 514 to determine a threshold level (output sum), which is passed through a saturation limiter 516 to limit the threshold, and is then compared 518 with the absolute values 506 of the detection frame pixels. In the illustrated embodiment, if a pixel is determined 518 to have a signal value above the saturation level 516, and is also determined 520 to be a local maximum 330, then it is designated to be a hotspot (quad-peak) 328 and is forwarded to the signal table manager 323, which is also referred to herein as the "PLF table manager."

The PLF table manager 323 compares the hotspots with laser signal entries included in a "laser signal table" of previous hotspot detections that is maintained by the PLF table manager 323. As noted above, the laser signal table is also referred to herein as the "Position, Level, and (source identifying) Feature" table or "PLF" table. It should be noted that although the table is referred to herein as a "laser signal table," in some embodiments the table includes entries that correspond to previously detected hotspots that are not laser signals.

Each entry in the laser signal table includes its coordinate values, signal value, and (in embodiments) source identifying feature information pertaining to the laser signal or other detected hotspot, as well as a record of the most recent detection frame number in which the laser signal or other hotspot was detected. In the embodiment of FIGS. 3A and 3B, the PLF table manager 323 is included in the controller 316. It should be noted that, for consistency of terminology, the term "PLF table" is treated as synonymous with "laser signal table," and is used herein to refer to the disclosed position and signal value tables, even in embodiments where the table does not further include source identifying feature information.

Figure 6:
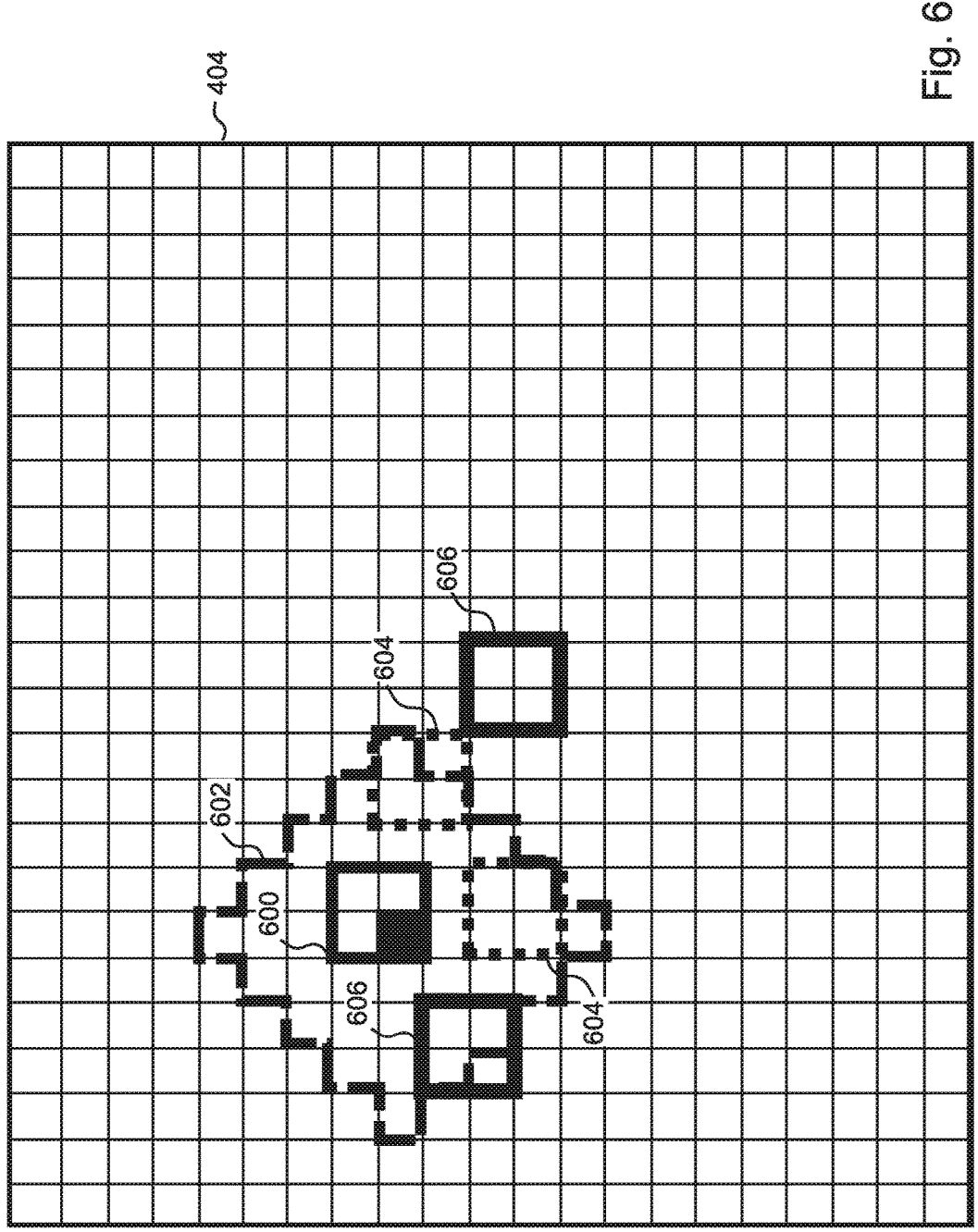
FIG. 6 illustrates comparison of hotspot positions on a focal plane array with previous detections recorded in a PLF table, and application of a designated minimum offset according to embodiments of the present disclosure.

With reference to FIG. 6, comparison of the detected hotspots 604, 606 with the laser signal entries in the PLF table includes computing offsets between each of the detected hotspot 604, 606 and all of the laser signal entries 600 in the PLF table. In FIG. 6, a designated minimum offset 602 surrounding a previously detected hotspot 600 included in the PLF table is indicated with dashed lines.

In some embodiments, the offset is calculated as a distance, i.e. as the square root of the sum of the squares of the X and Y coordinate differences. In the embodiment of FIG. 6, the offset calculation is simplified by calculating only the sum of the absolute values of the X-coordinate difference and the Y-coordinate difference. The calculation can be expressed as:

$$[|i_c - i_k| + |j_c - j_k|] > D \qquad (1)$$

where D is the minimum offset value, $i_c$ and $j_c$ are the coordinates of the newly detected hotspot, and the values $i_k$ and $j_k$ are the coordinates of the $k^{th}$ entry in the PLF table.

Note that, in the embodiment of FIG. 6, the coordinates of each "quad-cell" group of four pixels 600, 604, 606 are defined to be the coordinates of the pixel in the lower left corner of the group. Accordingly, even a quad-cell that lies mostly within the pixel offset region 602 is still considered to be outside of that region 602 if the lower-left pixel of the quad-cell 706 is outside of the region 602.

With reference to FIG. 7, after computing an offset 700 between each of the newly detected hotspots and all of the entries in the PLF table, if a newly detected hotspot is within a designated offset 702 of a laser signal entry in the PLF table, and the signal value of the new hotspot is less than the signal value of that entry 704, the newly detected hotspot is determined to be a repeat detection 706, whereby the most recent frame number is updated for the overlapping laser signal entry in the PLF table, but no new laser signal entry is added to the PLF table. In embodiments, upon repeat detection of a hotspot, the position, level, and/or source identifying information (e.g. wavelength, modulation characteristics, etc) of the existing laser signal entry is/are also adjusted 706, for example by updating the position, level and/or source identifying information to newly measured values, or by incorporating the newly measured values into static or sliding averages that are maintained by the PLF table manager 323.

In embodiments, if the signal value of the newly detected hotspot is greater 704 than the signal value of the corresponding PLF table entry, or if a newly detected hotspot does not fall within the designated offset of any existing laser signal entry in the PLF table 708, then the newly detected hotspot is designated as a new hotspot. In embodiments, considering a hotspot to be new if its signal value is greater than that of an overlapping, previously detected hotspot prevents a previously detected non-laser light source from inadvertently blocking detection of an actual laser communication signal that might subsequently appear at substantially the same location in the scene.

Upon determining that a hotspot is a new hotspot, information regarding the new hotspot is directed to a laser signal identifier 324, which determines 708 whether or not the new hotspot is a laser communication signal 300 or the beacon component 308 of a laser communication signal 300 by comparing the hotspot information with properties such as a frequency or modulation pattern that are expected properties of a laser communication signal or beacon.

Depending on the embodiment and on the nature of the new hotspot, the positions, source identifying characteristic(s), and amplitude levels of at least some of the new hotspots are added to the PLF table 710, along with the frame number in which each recorded hotspot was most recently detected. In embodiments, the laser signal identifier 324 further determines 712 if the hotspot is a beacon component 308 of a signal of interest (SOI).

In some embodiments, only entries pertaining to hotspots that have been identified by the laser signal identifier 324 as laser communication signals are added to the laser signal table (solid line from 704 to 708), while information pertaining to hotspots that are determined not to be laser communication signals is not added to the PLF table, or is removed from the PLF table if it was previously added (according to the embodiment). This approach prevents detection of a hotspot from a non-laser light source from inadvertently blocking detection of an actual laser communication signal that might subsequently be detected at substantially the same location. However, this approach can lead to repeated evaluation by the laser signal identifier of a hotspot that is not a laser communication signal. In some of these embodiments, only new hotspots that are laser beacons or other laser communication signals of interest are recorded in the PLF table.

In other embodiments, laser signal entries are made for all newly detected hotspots (dashed line from 704 to 710), including the coordinates and signal value of the hotspot, along with the frame number in which it was most recently detected, and information such as a Boolean value is included in each laser signal table entry to indicate whether or not the laser signal entry pertains to a laser communication signal. This approach can avoid repeated reconsideration by the laser signal identifier 324 of the same non-laser hotspot, but carries a risk that a weak laser communication signal could be masked by a stronger non-laser hotspot or jamming signal.

In embodiments, if the hotspot is determined to be a laser communication signal of interest (SOI) 712 transmitted by a node with which communication is desired, then in embodiments a beam directing device controller 326, which can be included in the controller 316, causes the beam directing device 304 to adjust 714 the direction of the incident beam 300 so that the beacon component 308 is centered on the FPA, and the data component 312 is directed onto a laser data receiver 314 such as a fiber optic, for receipt of laser communicated data. Note that, in the embodiment of FIG. 3A, the servo motor 318 of the beam directing device 304 is able to rotate the steering mirror 302 about two orthogonal axes, although only one rotation axis is shown in FIG. 3A for simplicity of illustration.

An example of a PLF table is presented in Table 1 below (note that the designation "unit(n)" in the table refers to an unsigned integer having "n" bits).

TABLE 1

Example of laser signal entries in a PLF table

| Position Indices (uint(8)) | | Level | Beacon Frequency Index | new hotspot? | Last Frame # |
|---|---|---|---|---|---|
| i_k | j_k | (unit(12)) | (unit(4)) | Boolean | (uint(12)) |
| 0 | 41 | 500 | 0 | 1 | 1215 |
| 10 | 170 | 127 | 9 | 0 | 1212 |
| 35 | 15 | 75 | 6 | 0 | 1111 |
| 150 | 135 | 225 | 11 | 0 | 768 |
| −1 | −1 | −1 | −1 | 0 | 0 |
| −1 | −1 | −1 | −1 | 0 | 0 |
| −1 | −1 | −1 | −1 | 0 | 0 |
| −1 | −1 | −1 | −1 | 0 | 0 |
| −1 | −1 | −1 | −1 | 0 | 0 |

Each laser signal entry in the example of Table 1 includes the position indices of the hotspot, its level, a "beacon frequency index" representing information relevant to a source identifying feature of the laser communication signal, as well as a Boolean value that represents whether the laser signal entry is new or a previously detected laser communication signal. In embodiments, each time the PLF table is updated, information pertaining to each of the entries that is flagged as being new is forwarded to the signal identifier 324, which determines whether the laser signal entry pertains to a laser signal or beacon component. If not, in some embodiments the entry is removed from the PLF table. In other embodiments, the PLF table maintains information regarding all detected hotspots, with indications included in the table that differentiate between hotspots that are laser signals or beacon components and those that are not.

In addition, it can be seen from Table 1 that the PLF table also records the most recent pixel frame number in which each recorded laser signal entry was detected. In embodiments, each time the PLF table is updated, entries that have not been re-detected for more than a specified number of frames are deleted from the table.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A method of identifying and monitoring candidate laser communication signals in a scene of interest, the method comprising:
    a) directing light received from the scene of interest onto a focal plane array (FPA) comprising a plurality of light sensors, each of the light sensors being associated with a pair of integer coordinates indicating a row and column that the light sensor occupies in the FPA, each of the light sensors being configured to generate a signal output;
    b) obtaining a detection frame of pixels, each of the detection frame pixels having a pair of integer coordinates equal to the coordinates of an associated light sensor in the FPA, and a detection signal value derived at least in part from the signal output of the associated light sensor in the FPA;
    c) identifying all local maximum pixels from among the detection frame pixels, each of the local maximum pixels being a pixel having a detection signal value that is greater than the detection signal values of all detection frame pixels having coordinates that differ by no more than one from the corresponding coordinates of the local maximum pixel;
    d) designating as hotspots all local maximum pixels having detection signal values that are greater than a minimum hotspot threshold value;
    e) for each of the hotspots:
        calculating an offset between the hotspot and each laser signal entry in a laser signal table according to differences between the coordinates of the hotspot and coordinates included in the laser signal entries;
        if there is an overlapping laser signal entry for which the calculated offset is less than a specified minimum offset, replacing a most recently detected frame number of the overlapping laser signal entry with a frame number of the detection frame of pixels; and
        if the calculated offset is greater than the specified minimum offset for all of the laser signal entries in the laser signal table, and if the hotspot meets designated laser signal table criteria, adding a new laser signal entry to the laser signal table having coordinates equal to the coordinates of the hotspot and a most recently detected frame number equal to the frame number of the detection frame of pixels.

2. The method of claim 1, wherein the detection signal values of the pixels in the detection frame are equal to the signal outputs of the associated light sensors of the FPA as measured at a measurement time of the detection frame.

3. The method of claim 1, wherein the method further comprises:
    obtaining a first frame of pixels from the FPA at a first measurement time, each of the first frame pixels having a pair of integer coordinates equal to the coordinates of an associated light sensor in the FPA and a signal value equal to the signal output of the associated light sensor at the first measurement time;
    obtaining a second frame of pixels from the FPA at a second measurement time that is delayed after the first measurement time by a time interval td, each of the second frame pixels having coordinates equal to coordinates of a corresponding first frame pixel and its associated light sensor, and having a signal value equal to the signal output of the associated light sensor at the second measurement time; and
    for each of the detection pixels in the detection frame, setting the detection signal value equal to the absolute value of a difference between the signal values of the first frame pixel and the second frame pixel having the same integer coordinates as the detection pixel.

4. The method of claim 1, further comprising, if, after completing step e) a difference between the most recently detected frame number of a laser signal entry in the laser signal table and the frame number of the detection frame of pixels exceeds a maximum value, removing the laser signal entry from the laser signal table.

5. The method of claim 1, wherein the designated laser signal table criteria specify that a new laser signal entry be added to the laser signal table pertaining to each designated hotspot for which the calculated offset is greater than the specified minimum offset for all of the laser signal entries in the laser signal table.

6. The method of claim 1, wherein determining if the hotspot meets the designated laser signal table criteria comprises:
directing at least one of measured information and light associated with the hotspot to a signal identifier; and
determining that the designated hotspot meets the designated laser signal table criteria if the hotspot is identified as a laser signal by the laser signal identifier.

7. The method of claim 6, wherein, in step e), the new laser signal entry further comprises source identifying information that indicates a source of the hotspot.

8. The method of claim 1, wherein, in step e), the new laser signal entry further comprises a signal value equal to the detection signal value of the hotspot.

9. The method of claim 1, wherein:
in step e), adding the new laser signal entry to the laser signal table further comprises setting a Boolean flag associated with the new laser signal entry to indicate that the new laser signal entry is new; and
the method further comprises, for all laser signal entries in the laser signal table that were not newly entered during steps a) through h), setting its associated Boolean flag to indicate that the laser signal entry is not new.

10. The method of claim 1, wherein the minimum hotspot threshold value is determined at least in part according to a computed Poisson noise level calculated according to a frame of pixels derived from the FPA.

11. The method of claim 10, wherein determining the minimum hotspot threshold value includes adding a minimum noise threshold value to the computed Poisson noise level.

12. The method of claim 1, further comprising, after step b) and before step c), for each of the pixels in the detection frame, replacing the detection signal value s(i,j), where i and j are the integer coordinates of the detection frame pixel, with a sum or an average S(i,j) of the detection signal value s(i,j) and at least one adjacent detection signal value s(k,l), where the absolute value of (i−k) is one and/or the absolute value of (j−l) is one.

13. The method of claim 12, wherein the values S(i,j) are quad-cell values calculated according to the formula S(i,j)=(s(i,j)+s(i+1,j)+s(i, j+1)+s(i+1, j+1))/4.

14. An apparatus for identifying and monitoring candidate laser communication signals in a scene of interest, the apparatus comprising:
a focal plane array (FPA) comprising a plurality of light sensors, each of the light sensors being associated with a pair of integer coordinates indicating a row and column that the light sensor occupies in the FPA, each of the light sensors being configured to generate a signal output;
a beam directing device configured to direct light from the scene of interest onto the FPA;
a hotspot identifier configured to:
obtain a detection frame of pixels, each of the detection frame pixels having a pair of integer coordinates equal to the coordinates of an associated light sensor in the FPA, and a detection signal value derived from the signal output of the associated sensor in the FPA;
identify all local maxima included among the detection frame pixels, the local maxima being defined as pixels having a detection signal value that is greater than the detection signal values of all detection frame pixels having integer coordinates that differ by no more than one from the corresponding integer coordinates of the local maximum pixel; and
designate as hotspots all of the local maxima having detection signal values that are greater than a minimum hotspot threshold value; and
a signal table manager configured to maintain a table of laser signal entries, each of the laser signal entries including a pair of integer coordinates, a signal value, and a most recently detected frame number, the signal table manager being further configured to receive information regarding the hotspots from the hotspot identifier, and for each of the hotspots:
calculate an offset between the hotspot and each of the laser signal entries in the laser signal table according to differences between the coordinates of the hotspot and the coordinates of the laser signal entries;
if there is an overlapping laser signal entry for which the calculated offset is less than a specified minimum offset, replace the most recently detected frame number of the overlapping laser signal entry with a frame number of the detection frame of pixels; and
if the calculated offset is greater than the specified minimum offset for all of the laser signal entries in the laser signal table, and if the designated hotspot meets designated laser signal table criteria, adding to the laser signal table a new laser signal entry having integer coordinates equal to the integer coordinates of the hotspot and a most recently detected frame number equal to the frame number of the detection frame of pixels.

15. The apparatus of claim 14, further comprising a frame differencer configured to:
obtain a first frame of pixels from the FPA at a first measurement time, each of the first frame pixels having a pair of integer coordinates equal to the coordinates of an associated light sensor in the FPA and a signal value equal to the signal output of the associated light sensor at the first measurement time;
obtain a second frame of pixels from the FPA at a second measurement time that is delayed after the first measurement time by a time interval td, each of the second frame pixels having a pair of integer coordinates equal to the to coordinates of a corresponding first frame pixel and its associated light sensor, and having a signal value equal to the signal output of the associated light sensor at the second measurement time; and
calculate a detection frame of pixels that is an edge detected frame of pixels, wherein each of the edge detected frame pixels comprises a pair of integer coordinates, and an edge detected signal value equal to the absolute value of a difference between the signal values of the first frame and second frame pixels having the same integer coordinates.

16. The apparatus of claim 14, wherein for each of the detection frame pixels, the frame differencer is configured, after calculating the edge detected frame of pixels, to replace the detection signal value s(i,j), where i and j are the integer coordinates of the detection frame pixel, with a sum or average S(i,j) of the detection signal value s(i,j) and at least one adjacent detection signal value s(k,l), where the absolute value of (i−k) is one and/or the absolute value of (j−l) is one.

17. The apparatus of claim 16, wherein the values S(i,j) are quad-cell values calculated according to the formula S(i,j)=(s(i,j)+s(i+1,j)+s(i, j+1)+s(i+1, j+1))/4.

18. The apparatus of claim 14, further comprising a laser signal identifier configured to determine if a hotspot is a laser signal, the signal table manager being further configured to:

cause at least one of measured information and light associated with the hotspot to be directed to the laser signal identifier if all of the calculated offsets are greater than the specified minimum offset; and if the hotspot is identified as a laser signal by the laser signal identifier, add a new laser signal entry to the laser signal table having integer coordinates equal to the integer coordinates of the hotspot and a most recently detected frame number equal to the frame number of the detection frame of pixels.

19. The apparatus of claim 18, wherein the laser signal table manager is further configured to include in the new laser signal entry source identifying information that indicates a source of associated laser signal.

20. The apparatus of claim 14, further comprising a beam dividing device configured to separate overlapping and congruent laser beams of differing wavelengths received from the scene of interest.

21. The apparatus of claim 20, wherein the beam dividing device comprises at least one of a diffraction grating, a prism, a beam splitter, and a bandpass filter.

22. The apparatus of claim 20, wherein the apparatus further comprises a laser data receiver, and the beam dividing device is configured to direct one of the congruent beams onto the laser data receiver while simultaneously directing the other of the congruent beams to the FPA.

23. The apparatus of claim 14, wherein the signal table manager is further configured to remove all laser signal entries from the laser signal table for which a difference between the most recently detected frame number of the laser signal entry and the frame number of the detection frame of pixels exceeds a maximum value.

24. The apparatus of claim 14, wherein the laser signal table manager is further configured to include the detection signal value of the associated hotspot as the signal value of the new laser signal entry.

25. The apparatus of claim 14, wherein each of the laser signal entries in the laser signal table includes a new entry Boolean flag, and the laser signal table manager is further configured to set the new entry Boolean flag of all new laser signal entries to indicate that they are new, and to set the new entry Boolean flags of all laser signal entries that are not new to indicate that they are not new.

26. The apparatus of claim 14, wherein the hotspot identifier is configured to determine the minimum hotspot threshold value at least in part according to a Poisson noise level calculated according to a frame of pixels derived from the FPA.

27. The apparatus of claim 26, wherein the hotspot identifier is configured to determine the minimum hotspot threshold value at least in part according to a sum of a noise threshold and the computed Poisson noise level.

* * * * *